J. J. ENGLERT.
MACHINE FOR MAKING SAW TOOTHED METAL FASTENERS.
APPLICATION FILED OCT. 23, 1912.
1,208,527.
Patented Dec. 12, 1916.
2 SHEETS—SHEET 1.
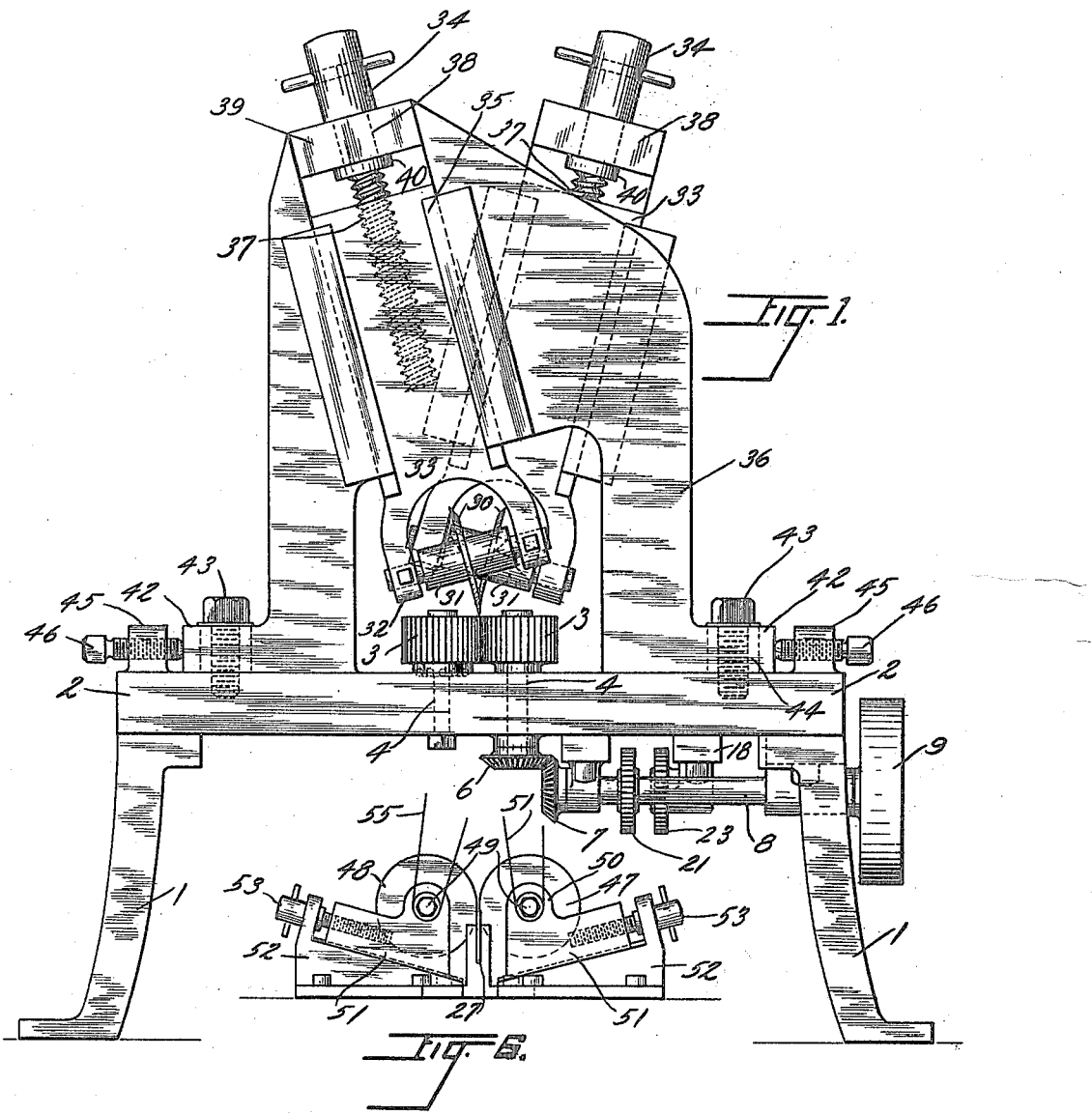

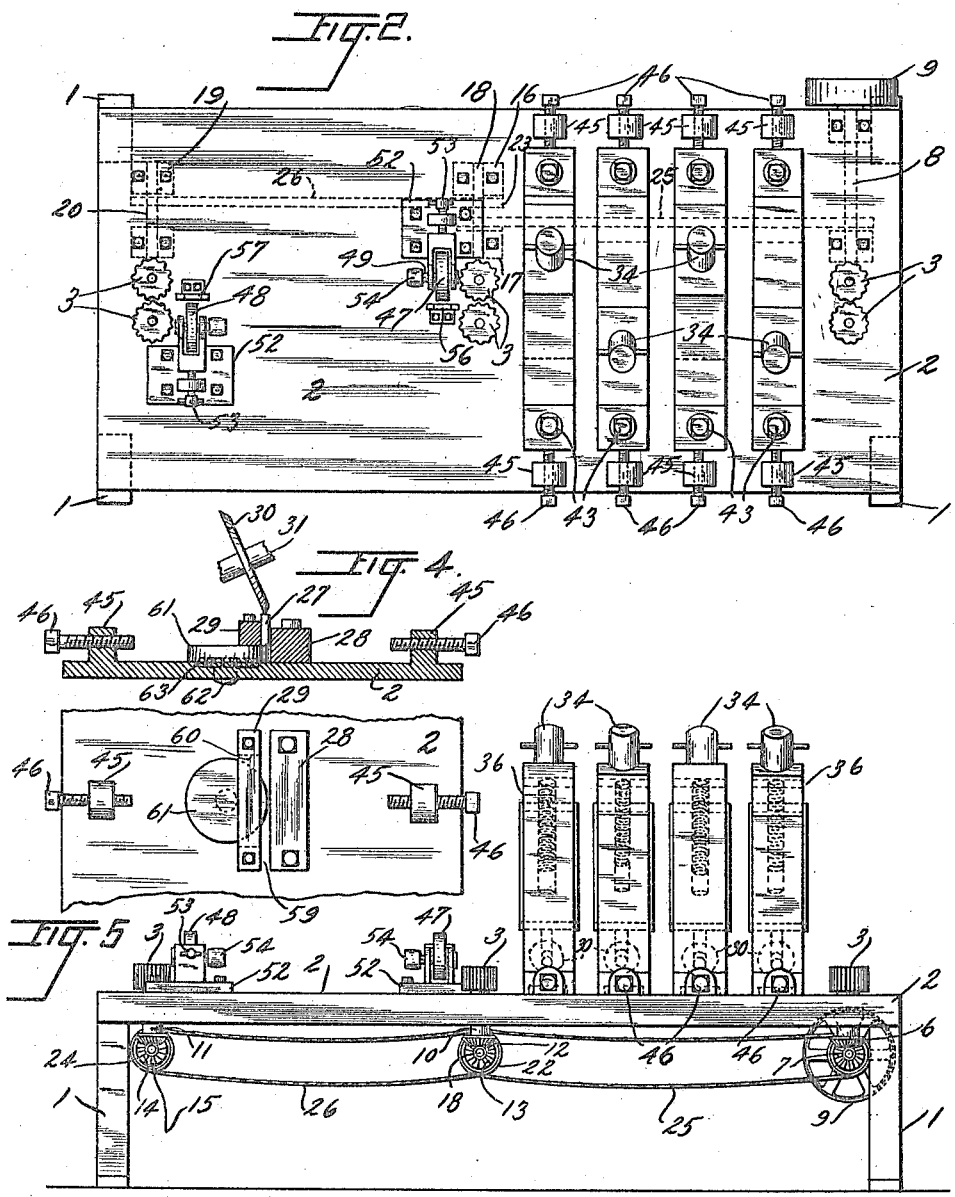

UNITED STATES PATENT OFFICE.

JOSEPH J. ENGLERT, OF CHICAGO, ILLINOIS, ASSIGNOR TO ACME STEEL GOODS COMPANY, OF CHICAGO, ILLINOIS, A CORPORATION OF ILLINOIS.

MACHINE FOR MAKING SAW-TOOTHED METAL FASTENERS.

1,208,527.      Specification of Letters Patent.      Patented Dec. 12, 1916.

Application filed October 23, 1912. Serial No. 727,277.

*To all whom it may concern:*

Be it known that I, JOSEPH J. ENGLERT, a citizen of the United States, residing at Chicago, Illinois, have invented certain new and useful Improvements in Machines for Making Saw-Toothed Metal Fasteners, of which the following is a specification.

The essential object of this invention is to provide a machine by which a metal strip is adapted to be corrugated, cut, and ground by a continuous operation and by the use of the herein-described machine an ordinary flat band or ribbon of iron or steel is converted into a strip which is corrugated and one edge of which is saw-toothed, the resulting product being depicted in Figures 7 and 8.

Among the various features of the invention are the fact that the metal strip is corrugated, cut, and ground by a continuous operation instead of by two or three separate operations, as in most old machines; the fact that the rotary cutting knives are capable of adjustment both vertically and horizontally with reference to the strip to be operated; the fact that the corrugated strip moves easily when being cut by the rotary cutting knives; the fact that the metal between the ridges of the cross corrugated strip is not cut away by a single operation on either side; the fact that each rotary cutting knife is adapted to cut a little deeper than the knife preceding it in the series; and the fact that the grinding wheels may be accurately adjusted to any desired position.

Other objects of the invention are described in the specification and particularly pointed out in the claims.

In the drawings, Fig. 1 is an end view of the machine looking in the direction toward which the blanks to be operated upon are fed; Fig. 2 is a top plan view looking downwardly in Fig. 1; Fig. 3 is a side elevation taken at a right angle to the views of both Figs. 1 and 2; Fig. 4 is a transverse sectional view of the bed or table; Fig. 5 is a companion view to Fig. 4 looking down from above in said Fig. 4; Fig. 6 is a detailed view looking toward the right in Fig. 2, it being understood that Figs. 1 and 6 are end views of the opposite ends of the machine; and Fig. 7 is an end view and Fig. 8 a side elevation of a strip which has been operated upon, Figs. 7 and 8 depicting the completed product of the machine.

The legs 1 support the bed 2 and the various operating parts are nearly all suitably carried upon the bed 2. The machine is provided with several pairs of rollers 3, which rollers are provided with fluted peripheries, as best shown in Figs. 1 and 2, and are carried upon short shafts 4 suitably journaled in bed 2. In the drawings, three sets of rollers 3 are shown but this number may be varied according to circumstances. The rollers may be spring-controlled or otherwise made adjustable so as to accommodate strips of different thicknesses or widths. At the bottom of one of the shafts 4 is a beveled gear 6 which meshes with and is driven by another beveled gear 7 carried upon shafts 8. A pulley 9 is secured to the shaft 8 outside of the machine and a belt, not shown, which is driven by any suitable source of power, passes over pulley 9. The beveled gear 7, upon the inner end of shaft 8, directly engages and drives that beveled gear 6 which is secured to that roller 3 at the extreme right-hand end, Fig. 2. One other roller 3 of each pair is likewise carried upon a vertical shaft, said shafts, for convenience, being designated 10 and 11 in Fig. 3 of the drawings. Shaft 10 carries a beveled gear 12 which meshes with and is driven by a corresponding beveled gear 13, and shaft 11 bears a beveled gear 14 which meshes with and is driven by beveled gear 15. Upon the under side of the bed 2, brackets 16 and 17 are bolted, which brackets support the shaft 18 which carry the beveled gear 13, and similar brackets 19 support shaft 20 that carries the beveled gear 15. Shaft 8 bears a band wheel 21 and shaft 18 bears the band wheels 22 and 23. Shaft 20 bears the band wheel 24. A belt 25 passes over the band wheels 21 and 22 and a similar belt 26 passes over band wheels 23 and 24. In this manner the revolution of shaft 8 is communicated to shafts 18 and 20, and shafts, 8, 18, and 20 are thus caused to rotate in unison and in the same direction, each of the rollers 3 upon the right-hand side of the machine, Fig. 1, thus likewise being caused to rotate in unison and in the same direction.

The rollers 3, as just stated, are provided with fluted peripheries, and the rollers comprising each pair are so fixed upon the bed that each ridge upon one of the rollers is adapted to be received within one of the grooves upon the other roller; hence, as the metal strip 27 which is to be operated upon passes between the first pair of rollers 3, the strip is thus corrugated. It should be understood, of course, that the strip which is fed into the pair of rollers 3 at the right-hand of Fig. 2 is originally a simple band or ribbon of metal of any desired dimensions. The strip 27 which is to be operated upon, is fed into the machine, passing first between the pair of corrugating rollers 3 at the right-hand end, Fig. 2, thence between the middle pair of rollers 3, and the strip is fed out of the machine by the pair of rollers 3 at the left-hand end of Fig. 2. The main part of the corrugating operation will, obviously, be performed by the first pair of rollers, that is say by the rollers on the right, Fig. 2. The other rollers 3 are fluted, however, because in that manner said other rollers not only have a better grip upon the strip and thus assist in feeding the strip through the machine but will also assist in completing any imperfect corrugations which may be left as the strip 27 emerges from the first pair of rollers.

To the bed 2 the guide blocks 28 and 29 are secured and the strip 27 passes between said guide blocks, the function of which blocks is, obviously, to prevent bending or springing of the strip 27. The cutting knives or disks 30 are carried upon shafts 31, which shafts are journaled in the arms 32 at the lower end of the slides 33. The slides 33 are adapted to be moved toward or away from the bed of the machine by the screws 34, and the members 33 are guided in their movement by the flanges 35 which are secured to the holders 36. The slides 33 are each provided with a screw-threaded tap-hole 37 which receives the screw carried upon the members 34. Each member 34 is provided with a cylindrical stud 38 which passes through the block 39, longitudinal movement of the member 34 being prevented by the head which rests upon block 39 and by the washer 40 below the block 39, and it will be obvious, therefore, that rotating the member 34 will move the slide 33 toward or away from the bed 2 as desired.

The holders 36 are provided with feet 42 which rest upon the bed 2 and bolts 43 pass through perforations 44 in the feet 42 and into the bed 2. When bolts 43 are tightened, therefore, the holders 36 are held fixed in position upon the bed 2. The bed carries ears 45 through which bolts 46 are adapted to pass and the inner ends of said bolts bear against the feet 42. By turning the bolts 46, therefore, the holders 36 can be moved from right to left or left to right in Fig. 1, and in this manner the position of the rotary cutter 30 carried upon any particular holder 36 can be adjusted with great exactness.

The slides 33 are not exactly vertical, but as most clearly appears in Fig. 1 of the drawings, are set at an angle of perhaps ten degrees to the perpendicular. That rotary cutter 30 which is supported by the holder 36 first in the series is inclined or tipped toward the left. That cutter retained by the holder 36 which is second in the series is tipped or inclined toward the right, and so on. The machine depicted in the drawings is shown as being provided with four holders 36, and, hence, with four rotating cutters 30. This number may be increased if desired, though it is preferable to preserve this staggered arrangement of the rotating cutters 30. It will be obvious from the drawings that the respective shafts 31 which carry the cutters 30, are arranged substantially at right angles to the axes of the members 34 and to the path of travel of the respective slides 33. The cutting edges of the rotating cutters 30 may be beveled as best shown in Figs. 1 and 4, and the beveled edge of the first cutter in the series turned toward the right, the beveled edge of the second cutter turned toward the left, and so on throughout the series.

The operation of the cutters 30 upon the edge of the strip 27 will usually leave a rough or saw edge which must be removed, and the grinders 47 and 48 are provided for that purpose. Said grinders, as best shown in Fig. 2, are set one on each side of the path of travel of the strip. The grinders 47 and 48 are carried upon shafts 49 which are retained in ears 50 upon the boxes 51. Said boxes are slidable upon the blocks 50 and are moved toward or away from the strip 27 by the screws 53. The path of travel of the boxes 51 is preferably oblique and not perfectly horizontal. The shafts 49 each carry pulleys 54 which are driven by belts 55. Opposite to the grinder 47 is a brace or block 56 and a similar block 57 is opposite to the grinder 48. The members 56 and 57 are both secured to the bed 2 by bolts or other suitable fasteners and serve to prevent bending of the corrugated strip 27 when the unsharpened edge is being ground by the grinders 47 and 48, which grinders are merely ordinary emery wheels or the like. The guide blocks 28 and 29 are secured to the bed 2 in such manner that the space 59 which is between said members is of just the right width to receive the corrugated strip 27. The guide block 29 is recessed at 60, and the disk or circular plate 61 projects beneath said guide block 29 and into the space 59 as best shown in Figs. 4 and 5. The disk 61 is mounted upon a short shaft 62, and balls 63 are placed intermediate the disk 61 and the bed 2. As the strip 27 is fed through the machine it will ride over said disks which will, obviously, revolve as the strip feeds forward. The several disks 61 are so placed that there is one disk beneath each cutter 30. The cutters 30, therefore, do not press the strip 27 into direct engagement with the bed 2, but do press the strip 27 against the disks 61. In this manner the metal strips are permitted to move beneath the cutters 30 with the minimum of friction.

As best shown in Fig. 1 of the drawings, the shafts 31 upon which the cutting knives are carried, exceed in length the diameter of the knives. More specifically, the shafts 31 are preferably made about seven inches in length and the knives are about four inches in diameter, and with this construction the shaft would have to be several thousandths of an inch out of place in order to throw the cutting disk away from the median line of the corrugated blank. Any errors which may arise as the parts wear out can be easily and quickly rectified by adjusting the trunnions upon which the shafts are mounted.

The operation of the machine is as follows: The blank from which the finished product is to be made and which as heretofore explained consists simply of an ordinary ribbon or band of metal, is first fed between the fluted rollers at the right-hand end, Fig. 2. As the blank passes between said rollers it is corrugated and is at the same time fed forward toward the left, Figs. 2 and 3. The upper edge of the strip 27 which, after leaving the first pair of rollers is a corrugated strip, is then presented to the cutters 30. These rollers are so adjusted that the first roller in the series makes a partial cut on the right side of the corrugated strip, Fig. 1. The second roller in the series makes a partial cut on the opposite side. The third cutter operates in the cut left by the first cutter in the series and cuts deeply enough to cut off all the metal between the edge and ridges of the corrugated strip. The fourth cutter operates in like manner upon the same side as the second cutter, and so on. For light work four cutters will be ample, but the number of cutters may be increased as necessary, though when the number of cutters exceeds four it is desirable to adjust the respective cutters so that each cutter will cut a little deeper than the one preceding it. By so arranging the machine, it is possible to start cutting very close to the middle of the corrugated strip, and in this manner by taking a partial cut first on one side and then on the other, a web of metal is always left to serve as a support and the teeth which are formed by the cutting operation will not cave in or be bent as would be the result if all of the metal to be removed from either side were cut off or removed at a single operation. After passing beneath the cutters 30 the corrugated strip 27 with its upper edge presenting substantially the appearance depicted in Figs. 7 and 8, passes through the second pair of corrugating or fluted rollers 3, which rollers serve not only to draw the strip forward or toward the left, Figs. 2 and 3, but also to remove any defects in the corrugations. Although the strip 27 when it emerges from the first pair of rollers will usually be perfectly corrugated, cutters 30 may tend to flatten out some of the corrugations but the second pair of rollers 3 will force the strip back into the same condition as it was immediately after leaving the first pair of rollers. As the strip 27, which has been both corrugated and then cut, feeds toward the left beyond the second pair of rollers, the strip is subjected to the action of the grinders 47 and 48, which grinders grind only the extreme upper or saw-toothed edge of the strip and thereby sharpen the same. After leaving the grinder 48 the strip, which is now corrugated, cut, and ground, passes between the rollers 3 at the extreme left, Fig. 2, and this emerges from the machine a completed article.

The blanks or strips 27 from which the completed articles are manufactured are usually furnished to the trade as ribbons wound upon suitable cores, the ribbons frequently being several hundred feet each in length. When the first end of the strip is originally fed into the machine, it is best not to move the cutters 30 to operative position until the first end has reached the second pair of fluted rollers 3, for, although the first pair of rollers 3 might push the strip past the cutters the operation proceeds more evenly when the strip is pulled past the cutters by the second pair of fluted rollers 3. To avoid the relatively slight waste or loss of material thus incurred because of the fact that the cutting or beveling operation cannot well be started until the end which is first fed into the machine has reached the second pair of rollers, said second pair of rollers may be placed in the space between the first and second holders 36, and other pairs of rollers 3 may be placed between the other pairs of holders 30, and the number of pairs of fluted rollers 3 which are provided and the respective positions in which they are placed, must be determined according to circumstances.

The completed product which is depicted in Figs. 7 and 8 is used very generally in the woodworking art and is employed for such purposes as holding different pieces of wood together so as to make furniture or boxes tighter, and for many similar objects. If the strip were merely corrugated it would be very difficult to drive the strip into the wood, but since this machine bevels off or sharpens one edge of the corrugated strip, it is relatively easy to drive the sharpened edge into the wood, and the strip when so driven into two adjoining pieces of wood will hold the pieces together serving as an efficacious substitute for nails, screws, glue, and the like.

It will be obvious from the foregoing detailed description that the blank is first corrugated by the rollers 3, then cut by the cutters 30, and then ground by the grinders 47 and 48, and that the successive steps of corrugating, cutting, and grinding the blank are performed as one continuous process and at one continuous operation. It will further be obvious that the beveling of the edge of the corrugated strip is performed by the two successive steps first of cutting and then of grinding, although one of those steps may be dispensed with if necessary. It will further be seen that the machine may be used for making corrugated strips of any desired dimensions, and although it is most economical to use blanks several hundred feet in length and then cut or shear the corrugated and beveled product into short lengths, it is feasible to feed short pieces into the machine instead of long pieces.

Machines are known in which the corrugated strip is beveled off or saw-toothed at one edge by means of traveling cutters which operate upon the blank while the blank is at rest, but in this machine the blank itself moves continuously past the cutting tools, having its edge beveled or cut as the blank thus moves. The herein-described machine, therefore, has a much larger capacity per unit of time than any machine or machines in which movable cutters operate upon a fixed blank, for in this machine the process can be carried on continuously and uninterruptedly from the time that the ribbon or band of steel first enters the machine until the time that the blank emerges from the machine as a completed product.

I claim as my invention:

1. In a machine of the character described, the combination of a bed, a plurality of fluted rollers upon said bed for feeding the blank to be operated upon, a pair of guide-blocks between which said blank must pass, a cutter adapted to operate upon said blank, a slide which carries said cutter, a holder within which said slide is adapted to move, means for moving the slide toward or away from the bed, and a rotatable plate mounted upon the bed beneath said cutter, the blank to be operated upon being adapted to rest upon said rotatable plate.

2. In a machine of the character described, the combination of a bed, a plurality of fluted rollers upon said bed for feeding the blank to be operated upon, a pair of guide-blocks between which said blank must pass, a cutter adapted to operate upon said blank, a slide which carries said cutter, a holder within which said slide is adapted to move, means for fixing the slide at a predetermined distance from the bed, and a rotatable plate mounted upon the bed beneath said cutter, the blank to be operated upon being adapted to rest upon said rotatable plate.

3. In a machine for making corrugated saw-toothed metal fasteners, the combination of guides forming a channel for holding a corrugated strip on edge with provisions for sustaining it both laterally and edgewise; means for continuously advancing the strip through said channel; and a rotary cutter angularly arranged with relation to said channel with its cutting edge in the path of travel of a part of the exposed edge of the strip and adapted to penetrate the said edge to one side of the median longitudinal line thereof cutting on a bevel toward the crowns of the corrugations on that side while the strip advances.

4. In a machine for making corrugated saw-toothed metal fasteners, the combination of guides forming a channel for holding a corrugated strip on edge with provisions for sustaining it both laterally and edgewise; means for continuously advancing the strip through said channel; a rotary cutter angularly arranged with relation to said channel with its cutting edge in the path of travel of a part of the exposed edge of the strip and adapted to penetrate the said edge to one side of the median longitudinal line thereof cutting on a bevel toward the crowns of the corrugations on that side while the strip advances; and a second such cutter similarly arranged and adapted to enter the cut made by the first cutter and to further penetrate the strip.

5. In a machine for making corrugated saw-toothed metal fasteners, the combination of guides forming a channel for holding a corrugated strip on edge with provisions for sustaining it both laterally and edgewise; means for continuously advancing the strip through said channel; and rotary cutters set at opposite angles to the channel with their cutting edges in the paths of travel of parts of the exposed edge of the strip on opposite sides of the median longitudinal line thereof and adapted to penetrate said edge cutting on bevels toward the crowns of the corrugations on the respective sides of the strip as the latter advances.

6. In a machine for making corrugated saw-toothed metal fasteners, the combination of guides forming a channel for holding a corrugated strip on edge with provisions for sustaining it both laterally and edgewise; means for continuously advancing the strip through said channel; rotary cutters set at opposite angles to the channel with their cutting edges in the paths of travel of parts of the exposed edge of the strip on opposite sides of the median longitudinal line thereof and adapted to penetrate said edge cutting on bevels toward the crowns of the corrugations on the respective sides of the strip as the latter advances; and a second pair of such cutters similarly arranged and adapted to enter the cuts made by the first cutters respectively and to further penetrate the strip.

7. In a machine for making corrugated saw-toothed metal fasteners, the combination of guides forming a channel for holding a corrugated strip on edge with provisions for sustaining it both laterally and edgewise; fluted rollers and their driving means for continuously advancing the strip through said channel; and a rotary cutter angularly arranged with relation to said channel with its cutting edge in the path of travel of a part of the exposed edge of the strip and adapted to penetrate the said edge to one side of the median longitudinal line thereof cutting on a bevel toward the crowns of the corrugations on that side while the strip advances.

8. In a machine for making corrugated saw-toothed metal fasteners, the combination of guides forming a channel for holding a corrugated strip on edge with provisions for sustaining it both laterally and edgewise; means for continuously advancing the strip through said channel; a rotary cutter angularly arranged with relation to said channel with its cutting edge in the path of travel of a part of the exposed edge of the strip and adapted to penetrate the said edge to one side of the median longitudinal line thereof cutting on a bevel toward the crowns of the corrugations on that side while the strip advances; and means for adjusting said cutter toward and from the edge of the strip.

9. In a machine for making corrugated saw-toothed metal fasteners, the combination of guides forming a channel for holding a corrugated strip on edge with provisions for sustaining it both laterally and edgewise; means for continuously advancing the strip through said channel; a rotary cutter angularly arranged with relation to said channel with its cutting edge in the path of travel of a part of the exposed edge of the strip and adapted to penetrate the said edge to one side of the median longitudinal line thereof cutting on a bevel toward the crowns of the corrugations on that side while the strip advances; and means for adjusting said cutter vertically and horizontally.

10. In a machine for making corrugated saw-toothed metal fasteners, the combination of guides forming a channel for holding a corrugated strip on edge with provisions for sustaining it both laterally and edgewise; means for continuously advancing the strip through said channel; a rotary cutter angularly arranged with relation to said channel with its cutting edge in the path of travel of a part of the exposed edge of the strip and adapted to penetrate the said edge to one side of the median longitudinal line thereof cutting on a bevel toward the crowns of the corrugations on that side while the strip advances; a slide with bearings supporting the cutter; a holder for the slide; means for laterally adjusting the holder; and means for vertically adjusting the slide.

11. In a machine for making corrugated saw-toothed metal fasteners, the combination of guides forming a channel for holding a corrugated strip on edge with provisions for sustaining it both laterally and edgewise; means for continuously advancing the strip through said channel; and rotary cutters set at opposite angles to the channel with their cutting edges in the paths of travel of parts of the exposed edge of the strip on opposite sides of the median longitudinal line thereof and adapted to penetrate said edge cutting on bevels toward the crowns of the corrugations on the respective sides of the strip, said cutters being in the form of disks with beveled peripheries and the bevels on opposed sides of the disks.

12. In a machine for treating metal strips, the combination of guides for laterally sustaining the strip; rotary means for sustaining it edgewise; means for continuously advancing the strip, and one or more cutters arranged to penetrate the edge of the strip.

13. In a machine for treating metal strips, the combination of guides for laterally sustaining the strip; a rotary disk for sustaining it edgewise; means for continuously advancing the strip, and one or more cutters arranged to penetrate the edge of the strip.

14. In a machine for treating metal strips, the combination of guides for laterally sustaining the strip; a horizontally arranged rotary disk with roller bearings for sustaining it edgewise; means for continuously advancing the strip, and one or more cutters arranged to penetrate the edge of the strip.

15. In a machine for making corrugated saw-toothed metal fasteners, the combination of a pair of corrugating rollers, a second pair of similar rollers, driving means applied to both pairs of rollers, suitable guides through which the strip is continuously advanced by said rollers, and one or more cutters mounted between the pairs of rollers and adapted to angularly penetrate the edge of the strip as it is so advanced by the same.

16. In a machine for making corrugated saw-toothed metal fasteners, the combination of a pair of corrugating rollers, a second pair of similar rollers, driving means applied to both pairs of rollers, suitable guides through which the strip is continuously advanced by said rollers, one or more cutters mounted between the pairs of rollers and adapted to angularly penetrate the edge of the strip as it is so advanced by the same, and rotary means for sustaining the strip edgewise.

17. In a machine for making corrugated saw-toothed metal fasteners, the combination of a pair of corrugating rollers, a second pair of similar rollers, driving means applied to both pairs of rollers, suitable guides through which the strip is continuously advanced by said rollers, one or more rotary cutters mounted between the pairs of rollers and adapted to angularly penetrate the edge of the strip as it is so advanced by the same, and rotary means for sustaining the strip edgewise.

18. In a machine of the class described, a strip guide, knives arranged on opposite sides of the strip guide with their cutting edges in inclined position with respect to the plane of the strip guide to chamfer the corners of a metal strip in the guide, and a pair of corrugating rolls adapted and arranged to draw a strip with relation to the knives.

19. In a machine of the class described, a strip guide having a narrow channel formed in a vertical plane, inclined knife blades arranged on opposite sides of the channel with their edges in position to chamfer a strip passing through the channel, the planes of the blades intersecting in the plane of the channel.

In testimony whereof I have hereunto affixed my name in the presence of two witnesses.

JOSEPH J. ENGLERT.

Witnesses:
ROBT. KLOTZ,
CHARLES B. JOHNSON.

Copies of this patent may be obtained for five cents each, by addressing the "Commissioner of Patents, Washington, D. C."